United States Patent [19]

Albanese

[11] Patent Number: 4,689,885
[45] Date of Patent: Sep. 1, 1987

[54] APPARATUS FOR CUTTING OUT A FACE IN A PUMPKIN

[76] Inventor: Thomas C. Albanese, 1 Summerset Dr., Smithtown, N.Y. 11787

[21] Appl. No.: 868,575

[22] Filed: May 30, 1986

[51] Int. Cl.⁴ ............................ B26D 3/00; B26F 1/46
[52] U.S. Cl. .......................................... 30/316; 30/301
[58] Field of Search ...................... 83/201, 54; 30/128, 30/130, 316, 301; 425/289, 298

[56] References Cited

U.S. PATENT DOCUMENTS

| 1,977,017 | 10/1934 | Schiller | 30/301 X |
| 3,053,203 | 9/1962 | Gaddini | 30/130 X |
| 4,296,659 | 10/1981 | Nauman | 83/54 |

Primary Examiner—Douglas D. Watts
Attorney, Agent, or Firm—Michael I. Kroll

[57] ABSTRACT

An apparatus for cutting out a face in a pumpkin is provided that consists of a handle that is removable from various shaped housings which are adapted to cutout eyes, nose and mouth in the pumpkin by removing different shaped pieces from a side of the pumpkin.

6 Claims, 10 Drawing Figures

APPARATUS FOR CUTTING OUT A FACE IN A PUMPKIN

BACKGROUND OF THE INVENTION

1. Field of the Invention

The instant invention relates generally to kitchen tools and more specifically it relates to an apparatus for cutting out a face in a pumpkin.

2. Description of the Prior Art

Numerous kitchen tools have been provided in prior art that are adapted to prepare various foods, such as cutters, grinders, graters, peelers and zesters. While these units may be suitable for the particular purpose to which they address, they would not be as suitable for the purposes of the present invention as heretofore described.

SUMMARY OF THE INVENTION

A primary object of the present invention is to provide an apparatus for cutting out a face in a pumpkin that will overcome the shortcomings of the prior art devices.

Another object is to provide an apparatus for cutting out a face in a pumpkin that is shaped to cut out the eyes, nose and mouth of the pumpkin by removing different shaped pieces from a side of the pumpkin.

An additional object is to provide an apparatus for cutting out a face in a pumpkin that is fabricated out of lightweight and durable material so that a person using the unit will have no difficulty in doing so.

A further object is to provide an apparatus for cutting out a face in a pumpkin that is simple and easy to use.

A still further object is to provide an apparatus for cutting out a face in a pumpkin that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
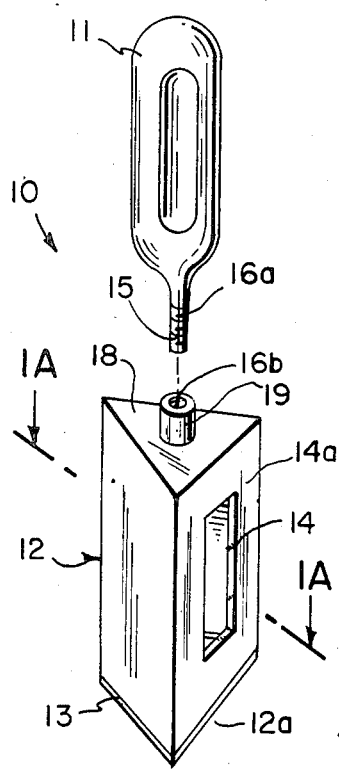
FIG. 1 is a perspective view of a first form of the invention being triangular shaped to make the nose and eye cutouts in the pumpkin.
Figure 6:
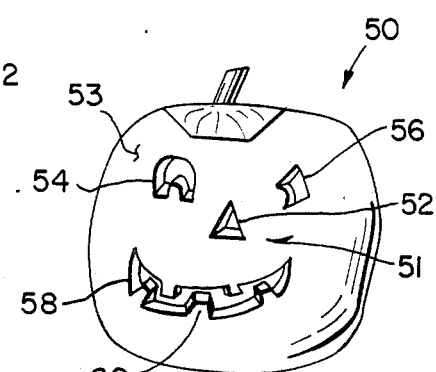
FIG. 6 is a front view of the pumpkin showing the various shaped cutout to make the face thereon.
Figure 1A:
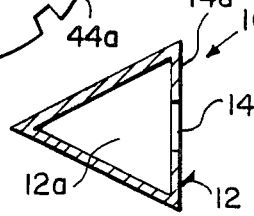
FIG. 1A is a cross sectional view taken along line 1A—1A in FIG. 1.

Turning now descriptively to the drawings, in which similar reference characters denote similar elements throughout the several views, FIGS. 1 and 1A illustrate an apparatus 10 for cutting out a face 51 in the pumpkin 50 (see FIG. 6), which consists of a hollow housing 12 that has an open end 12a with a beveled edge 13 and a slot 14 within side 14a thereof. A handle 11 is on other end 18 of the housing 12 opposite the open end 12a. A person (not shown) can grip the handle 11 and push the beveled edge 13 of the housing through a side 53 of the pumpkin 50 to make the face 51 by forming a pumpkin piece (not shown) within the housing 12 and allowing removal of the pumpkin piece by pushing the pumpkin piece out of the housing 12 via the slot 14 in the housing.

Figure 2:
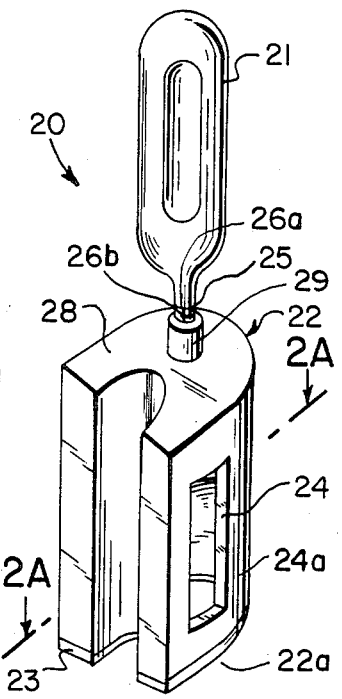
FIG. 2 is a perspective view of a second form of the invention being U-shaped to make other types of eye cutouts.
Figure 2A:
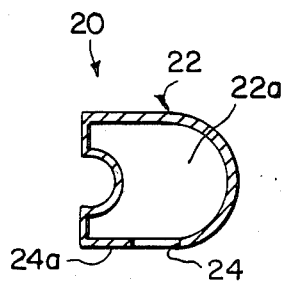
FIG. 2A is a cross sectional view taken along line 2A—2A in FIG. 2.

The handle 11 is removable from the housing 12 and includes a shank 15 that has external threads 16a thereon. A boss 19 extends beyond surface of the other end 18 of the housing 12 opposite the open end 12a. The boss 19 has internal threads 16b therein so that the shank 15 of the handle 11 can be removably threaded to the boss 19. As shown in FIGS. 1 and 1A the housing 12 is generally triangular in cross section so as to be used to form a nose 52 and eye (not shown) cutouts in the pumpkin 50. As shown in FIGS. 2 and 2A the housing 22 of the apparatus 20 is generally U-shaped in cross section so as to be used to form eye cutouts 54 in the pumpkin 50.

Figure 3:
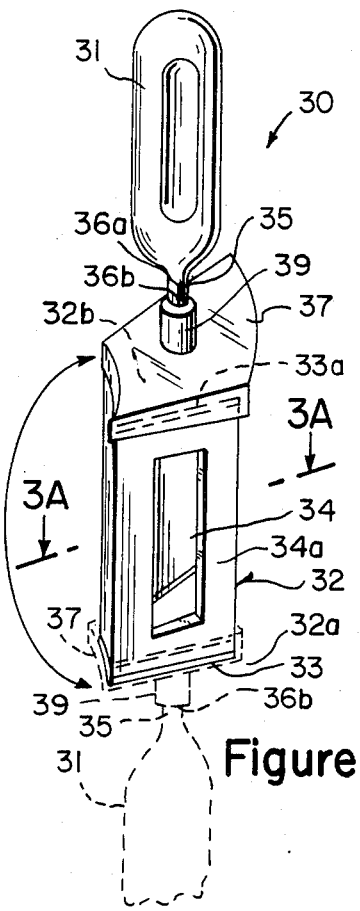
FIG. 3 is a perspective view of a third form of the invention being trapezium shaped with two curved sides to make still other types of eye cutouts.
Figure 3A:
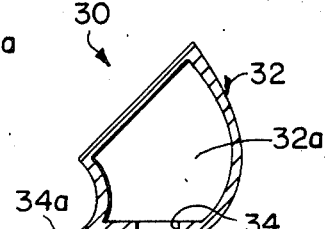
FIG. 3A is a cross sectional view taken along line 3A—3A in FIG. 3.

As shown in FIGS. 3 and 3A the housing 32 of the apparatus 30 is generally trapezium with two curved sides in cross section so as to be used to form left (not shown) and right 56 eye cutouts in the pumpkin 50. The handle 31 is removable from the housing 32 and includes a shank 35 that has external threads 36a thereon. The housing 32 has a second open end 32b with a second beveled edge 33a opposite the first open end 32a with first beveled edge 33. A removable cap 37 is provided which has a boss 39 extending beyond surface of the cap 37. The boss 39 has internal threads 36b so that the shank 35 of the handle 31 can be removably threaded to the boss 39. The cap 37 is generally trapezium with two curved sides in cross section so as to removably attached to either of the ends 32a, 32b of the housing 32 to form the left and right eye cutouts in the pumpkin 50.

Figure 4:
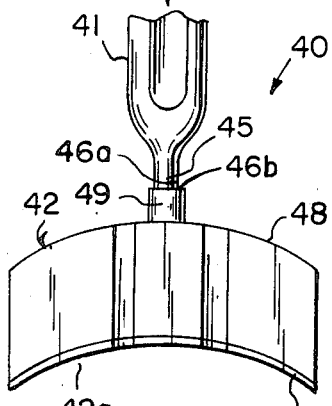
FIG. 4 is a top plan view of a fourth form of the invention being mouth shaped to make the mouth cutout in the pumpkin.
Figure 4A:
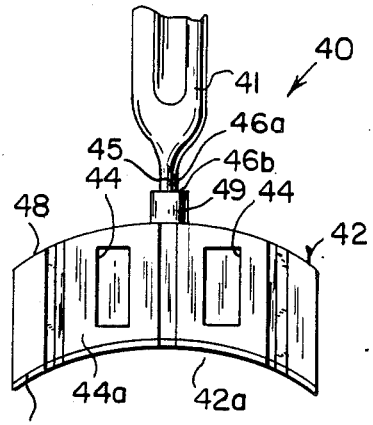
FIG. 4A is a bottom plan view thereof.
Figure 5:
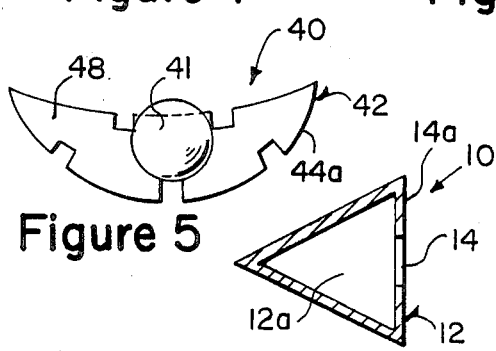
FIG. 5 is a rear view thereof as indicated by arrow 5 in FIG. 4.

In FIGS. 4, 4A and 5 the housing 42 of the apparatus 40 is generally mouth shaped and has a plurality of teeth in cross section so as to be used to form a mouth 58 with teeth 60 cutout in the pumpkin 50. The open end 42a and opposite end 48 of the housing 42 are curved so as to generally match curvature of the side 53 of the pumpkin 50 when forming the mouth 58 with teeth 60 cutout in the pumpkin.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An apparatus for cutting out a face in a pumpkin, which comprises:
   (a) a hollow housing having an open end with a beveled edge and a slot within side thereof; said housing being generally trapezium with two curved sides in cross section so as to be used to form left and right eye cutouts in said pumpkin, said housing having a second open end with a second beveled edge opposite said first open end;
   (b) a handle on other end of said housing opposite said open end so that a person can grip said handle and push said beveled edge of said housing through a side of said pumpkin to make said face by forming a pumpkin piece within said housing and allowing removal of said pumpkin piece by pushing said pumpkin piece out of said housing via said slot in said housing, said handle being removable from said housing a including a shank having external threads thereon; and
   (c) a removable cap having a boss extending beyond surface of said cap, said boss having internal threads therein so that said shank of said handle can be removably threaded to said boss, said cap being generally trapezium with two curved sides in cross section so as to be removably attached to either of said ends of said housing to form said left and right eye cutouts in said pumpkin.

2. An apparatus as recited in claim 1, further comprising:
   (a) said handle being removable from said housing and includes a shank having external threads thereon; and
   (b) a boss extending beyond surface of said other end of said housing opposite said open end, said boss having internal threads therein so that said shank of said handle can be removably threaded to said boss.

3. An apparatus as recited in claim 2, wherein said housing being generally triangular in cross section so as to be used to form a nose and eye cutouts in said pumpkin.

4. An apparatus as recited in claim 2, wherein said housing being generally U-shaped in cross section so as to be used to form eye cutouts in said pumpkin.

5. An apparatus as recited in claim 2, wherein said housing being generally mouth shaped having a plurality of teeth in cross section so as to be used to form a mouth with teeth cutout in said pumpkin.

6. An apparatus as recited in claim 5, wherein said open end and said opposite end of said housing are curved so as to generally match curvature of said side of said pumpkin when forming said mouth with teeth cutout in said pumpkin.

* * * * *